(12) United States Patent
Whittenberger

(10) Patent No.: US 7,090,487 B2
(45) Date of Patent: Aug. 15, 2006

(54) CATALYTIC COMBUSTOR HAVING HIGH CELL DENSITY

(75) Inventor: William A. Whittenberger, Leavittsburg, OH (US)

(73) Assignee: Catacel Corp., Leavittsburg, OH (US)

( * ) Notice: Subject to any disclaimer, the term of this patent is extended or adjusted under 35 U.S.C. 154(b) by 849 days.

(21) Appl. No.: 10/054,486

(22) Filed: Jan. 22, 2002

(65) Prior Publication Data

US 2003/0138362 A1    Jul. 24, 2003

(51) Int. Cl.
*F23Q 11/00* (2006.01)
*B01D 50/00* (2006.01)

(52) U.S. Cl. ............ 431/268; 422/177; 422/180; 29/890

(58) Field of Classification Search ............ 29/890, 29/890.01, 890.02; 431/7, 268, 328; 60/723; 428/594
See application file for complete search history.

(56) References Cited

U.S. PATENT DOCUMENTS

| | | | |
|---|---|---|---|
| 4,576,800 A | 3/1986 | Retallick | |
| 5,045,403 A * | 9/1991 | Maus et al. | 428/593 |
| 5,202,303 A | 4/1993 | Retallick et al. | |
| 5,672,324 A * | 9/1997 | Okamoto et al. | 422/174 |
| 5,737,839 A * | 4/1998 | Whittenberger et al. | 29/890 |
| 6,060,173 A | 5/2000 | Retallick | |
| 6,334,769 B1 * | 1/2002 | Retallick et al. | 431/7 |
| 6,403,039 B1 * | 6/2002 | Bruck et al. | 422/180 |
| 6,475,446 B1 * | 11/2002 | Horiike et al. | 422/180 |
| 6,817,860 B1 * | 11/2004 | Whittenberger | 431/170 |
| 2004/0185400 A1 * | 9/2004 | Cornelison et al. | 431/7 |

* cited by examiner

*Primary Examiner*—Eric Compton

(57) ABSTRACT

A catalytic combustor is formed from a stack of flat and corrugated metal strips. The stack may or may not be wound into a spiral or formed into some other curved structure. Some of the strips are displaced, or offset, relative to other strips, such that some strips do not extend as far as the end faces of the stack. The latter feature increases the effective height of the corrugations, at the end faces, and makes it feasible to weld the strips together. In one embodiment, there are high-amplitude corrugated strips and low-amplitude corrugated strips. The low-amplitude corrugated strips increase the effective cell density, but are displaced from the end faces of the stack so as to permit convenient welding. The resulting combustors therefore have very high cell density, yet can be manufactured economically.

6 Claims, 4 Drawing Sheets

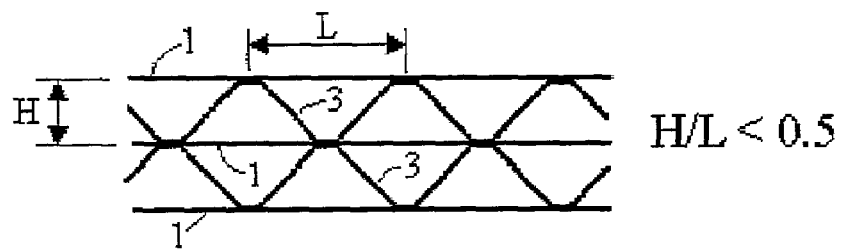
Figure 1a
Prior Art
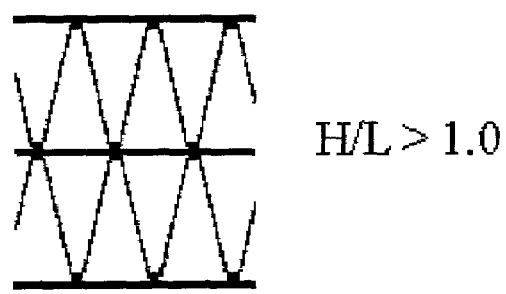
Figure 1b
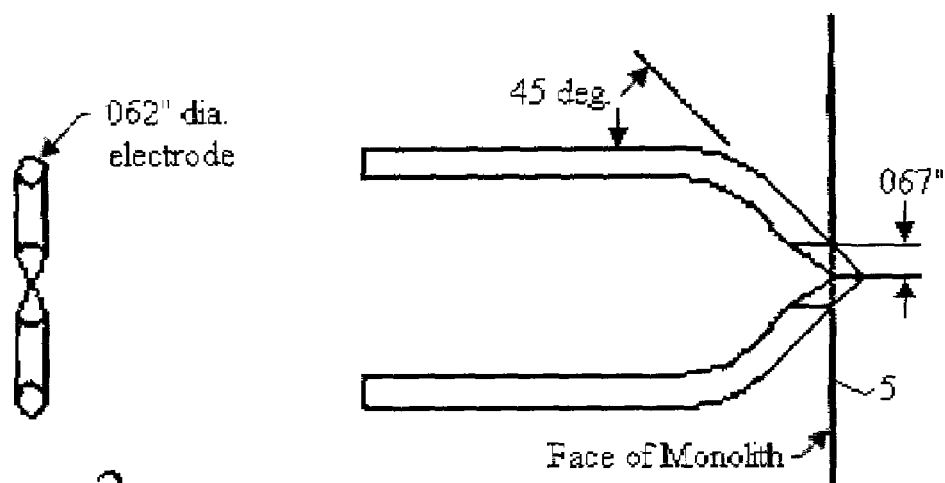
Figure 2a
Prior Art
Figure 2b
Prior Art

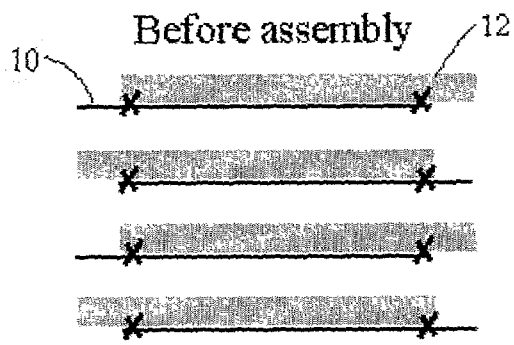
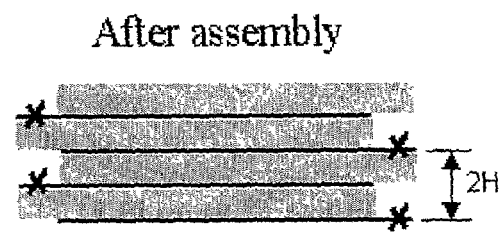
Figure 3a
Figure 3b
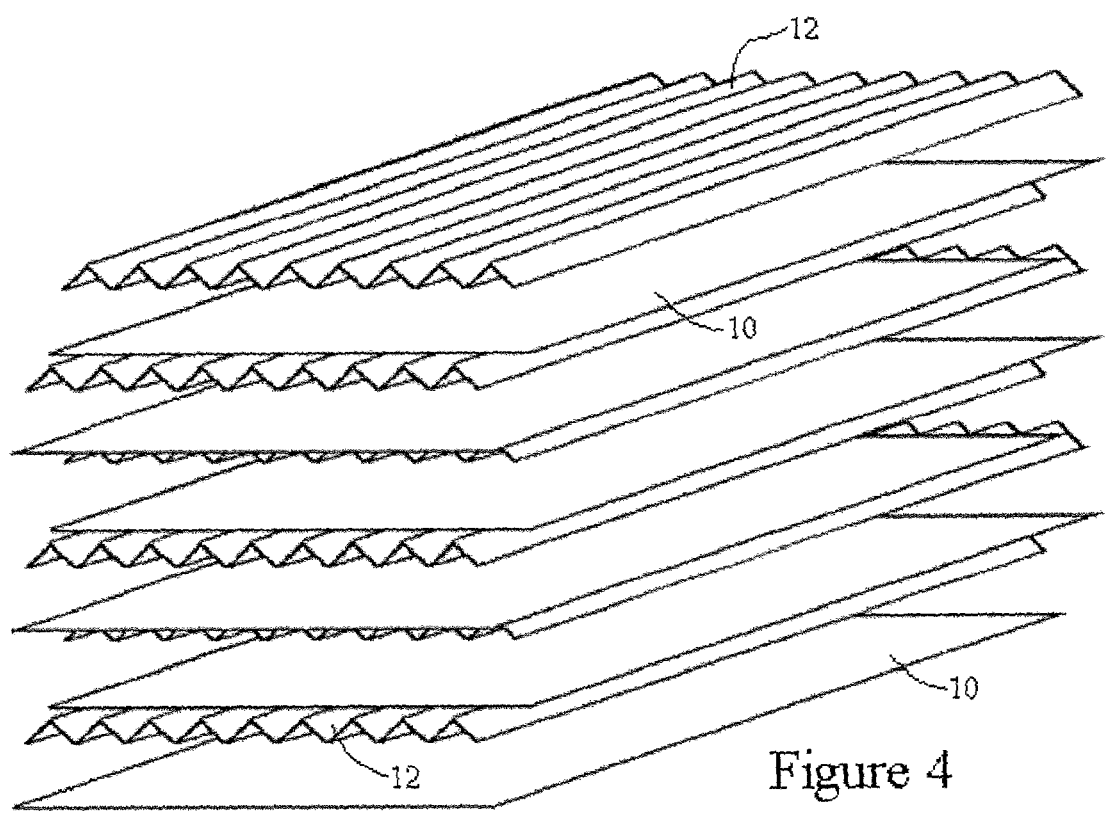
Figure 4

CATALYTIC COMBUSTOR HAVING HIGH CELL DENSITY

BACKGROUND OF THE INVENTION

This invention relates to catalytic combustors, especially those made of a plurality of pieces of metal foil arranged in a stack.

It has been known to make catalytic combustors by providing one or more strips of metal foil, stacking and/or folding the strips to form a monolith, and coating all or part of the monolith with catalyst. Examples of such combustors are given in U.S. Pat. Nos. 4,576,800, 5,202,303, and 6,060,173, the disclosures of which are incorporated herein by reference.

Catalytic combustors typically include flat strips alternating with corrugated strips. The corrugated strips tend to prevent the monolith from collapsing, and the corrugations help to define a cross-section having a large number of channels or cells. Increasing the density of such cells improves the efficiency of the combustor, by increasing the effective area for contact between the combustion gas and the catalyst disposed on the cell walls. Thus, it is usually an object of designers of catalytic combustors to maximize the density of the cells.

However, there is a major practical limitation on the cell density obtainable with the structures described above. The various strips of the monolith must be fastened together so that they can withstand the gas pressure in the combustor without falling out. The preferred means of fastening is welding. But it becomes very difficult to weld a structure in which the cells are very small.

Typically, a tweezer welder is used to reach inside the cells after assembly of the stack, and to weld together the ends of all the foil pieces. But this method is difficult to use when the cell density is of the order of 300 cpsi (cells per square inch), and where the cell height is typically less than about 0.05 inches. In such conditions, the tweezer welder cannot enter the cell.

The present invention provides methods whereby a tweezer welder can be advantageously used to fasten the pieces of foil in a catalytic combustor, even for relatively high cell densities. The invention also provides combustor structures which readily lend themselves to such welding.

SUMMARY OF THE INVENTION

The present invention comprises a catalytic combustor, and a method of making a catalytic combustor. The combustor comprises a stack of flat and corrugated strips which together define a plurality of cells, wherein the density of cells, when viewed in cross-section, is at least 300 cells per square inch (cpsi).

In one embodiment of the invention, the corrugations are constructed with an aspect ratio sufficiently great to allow a tweezer welder to be inserted into the combustor so as to weld adjacent strips together. The aspect ratio may be greater than about 0.75, or even greater than about 1.0.

In another embodiment of the invention, one forms pairs of flat and corrugated strips, wherein the flat strip of each pair is offset relative to the corrugated strip of each pair. The flat strip of each pair is welded to the corrugated strip of the pair. The pairs are then arranged in a stack, and are welded to each other to form a unitary structure. In the above-described stack, the strips are arranged such that, in alternate pairs, the flat strip is offset in one direction, and in the remaining pairs, the flat strip is offset in the opposite direction. The result is a combustor in which the effective corrugation height, at the end faces of the combustor, is twice the height of the corrugations of a single strip. Thus, the structure produced by the above method can be made with a substantially increased cell density, while still allowing tweezer welding to be done without difficulty.

In another embodiment, the combustor comprises a plurality of flat strips, a plurality of corrugated strips having low-amplitude corrugations, and a plurality of corrugated strips having high-amplitude corrugations. All of the corrugated strips have essentially the same corrugation pitch. The strips are arranged in a stack such that pairs of flat strips are separated by a high-amplitude corrugated strip, and such that there are two low-amplitude corrugated strips between each pair of flat strips. The low-amplitude corrugated strips are recessed from the ends of the other strips. The result is a combustor having a high cell density, determined primarily by the channels formed by the low-amplitude corrugated strips, but in which the effective corrugation height, at the ends of the combustor, is relatively high due to the recessed position of the low-amplitude corrugated strips.

The present invention therefore has the primary object of providing a catalytic combustor formed of a stack of flat and corrugated strips, in which the combustor has a plurality of cells, and in which the density of such cells is at least about 300 cells per square inch.

The invention has the further object of providing a combustor as described above, wherein the strips defining the combustor can be easily welded together by a tweezer welder.

The invention has the further object of substantially increasing the practical maximum cell density of a catalytic combustor.

The invention has the further object of providing a catalytic combustor in which the cell density is maximized, but which also can be assembled economically.

The invention has the further object of providing methods of making a catalytic combustor.

The reader skilled in the art will recognize other objects and advantages of the present invention, from a reading of the following brief description of the drawings, the detailed description of the invention, and the appended claims.

BRIEF DESCRIPTION OF THE DRAWINGS

FIG. 1a provides a fragmentary cross-sectional view of a catalytic combustor in which the cells have an aspect ratio within the teachings of the prior art.

FIG. 1b provides a fragmentary cross-sectional view of a catalytic combustor in which the aspect ratio of the cells is chosen according to one embodiment of the present invention.

FIG. 2a provides an end view of a pair of tweezer welding electrodes, used in the prior art.

FIG. 2b provides a side elevational view of a pair of tweezer welding electrodes, used in the prior art, and also showing, in schematic form, the face of a catalytic combustor whose structural members are to be welded together.

FIG. 3a provides a schematic diagram showing the positioning of various flat and corrugated layers of a catalytic combustor being assembled according to a second embodiment of the present invention.

FIG. 3b provides a schematic diagram similar to that of FIG. 3a, and showing the layers in an assembled condition.

FIG. 4 provides an exploded perspective view showing the various layers of the catalytic combustor symbolized by FIG. 3b.

FIG. 6a provides a fragmentary cross-sectional view of a catalytic combustor made according to a third embodiment of the present invention.

FIG. 6b provides a diagram which represents a side elevation of the catalytic combustor shown in FIG. 6a.

DETAILED DESCRIPTION OF THE INVENTION

Figure 5:
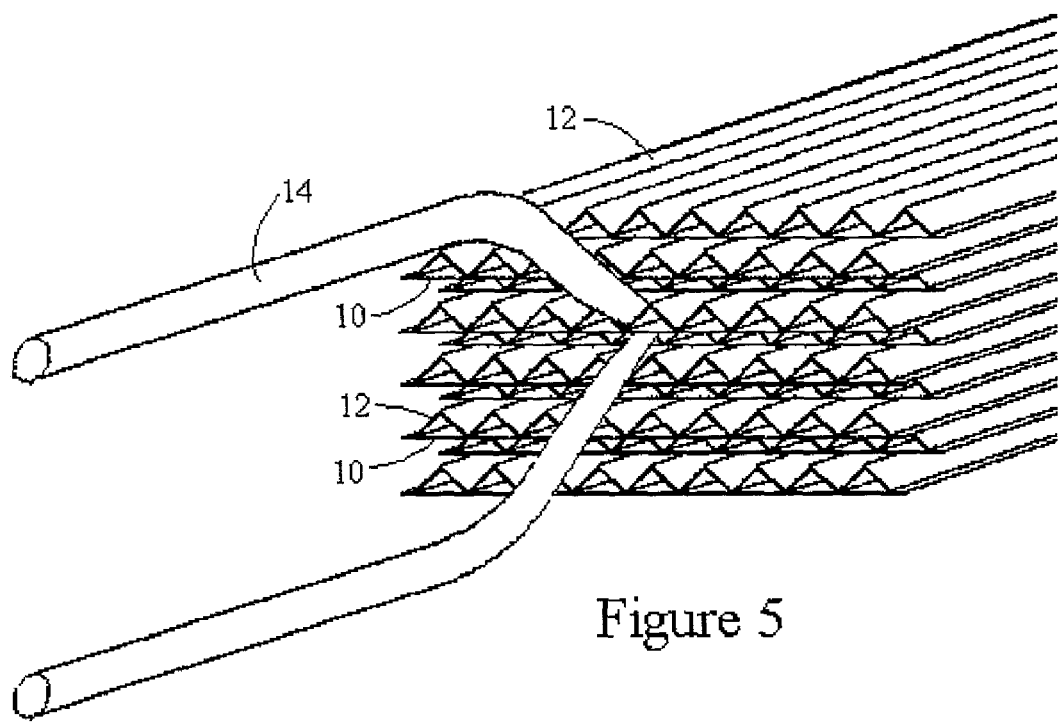
FIG. 5 provides a fragmentary perspective view showing a tweezer welder being used to weld layers of the catalytic combustor symbolized by FIG. 3b.

In the present specification, the term "stack" is used to describe a plurality of flat and corrugated metal sheets or strips. For convenience of illustration, the stacks illustrated in the drawings comprise strips or sheets which are generally flat and parallel to each other, and which together define a generally rectangular structure. But the term "stack" is intended to have a more general meaning, including structures in which the sheets or strips have curved surfaces. For example, a "stack" can be constructed by providing a plurality of flat strips alternating with corrugated strips, and winding the structure into a spiral. Or, an assembly of initially flat strips could be curved into an involute, to make an annular combustor. All of these structures can be welded using the techniques of the present invention. The term "stack" is intended to include all of these alternatives.

A first solution to the problem of welding a catalytic combustor having a high cell density is to increase the aspect ratio of the cells. To illustrate the problem solved by the invention, FIG. 1a shows a fragmentary cross-sectional view of a prior art combustor, in which the aspect ratio is relatively low. The combustor includes corrugated pieces of foil 3 sandwiched between flat pieces of foil 1. The aspect ratio is defined as the height H of the corrugation divided by the length (or period) L of the corrugation. In FIG. 1a, the aspect ratio H/L is less than 0.5. Typical cells made in the past have an aspect ratio of about 0.4. For a combustor having a cell density of 300 cpsi (cells per square inch), the latter aspect ratio implies that the height H of the corrugations is about 0.051 inches, and the length L is about 0.13 inches. The structure is designed such that 2/HL is approximately equal to the cell density (300 cpsi).

The prior art structure of FIG. 1a is difficult or impossible to assemble by tweezer welding, because the tweezer itself occupies a certain minimum height to achieve the desired pressure of one prong against the other. It is not practical to insert a tweezer welder into such tiny cells. This problem is made clearer by FIGS. 2a and 2b, which show a typical pair of tweezer welder electrodes. FIG. 2b shows the relationship between the tweezer welder electrodes and the face 5 of the monolith which comprises a stack of strips forming the catalytic combustor.

To weld the kinds of materials needed to make a catalytic combustor, the electrodes are typically about 0.0625 inches in diameter, and bent at an angle of 45 degrees, as shown. The ends of the electrodes are ground into a V-shape to obtain a linear weld which is typically 0.005 inches wide and 0.088 inches long (0.088 approximately equals 0.062/sin (45°)). Without further grinding, one would need a cell height of 0.088 inches as well, just to be able to insert the welder into the monolith.

In FIG. 2b, the inner surfaces of the ends of the electrodes are shown to be ground slightly such that the ends do not make a 45° angle with the horizontal, but instead make a somewhat smaller angle. This construction means that the welding can be done without forcing the electrodes to reach too far into the monolith. The resulting weld may be approximately 0.005 inches wide and 0.06 inches long. The cell height can now be as small as about 0.067 inches.

The problem of tweezer welding a catalytic combustor can be solved by increasing the aspect ratio, as illustrated in FIG. 1b. In the example given above, if the cell aspect ratio is changed to H/L=1.5, using different corrugation methods and/or tooling, the value of H can be increased to about 0.1 inches, and L is about 0.066 inches. This structure is more easily assembled by tweezer welding than the structure of FIG. 1a, because the corrugations provide sufficient height to accommodate the vertical dimension of the tweezer welder. Methods are known in the art for producing corrugations having these higher aspect ratios. According to this embodiment of the invention, the aspect ratio should be not greater than about 1.5, and preferably not greater than about 1.0.

More generally, the aspect ratio should be chosen such that the corrugations will accommodate the vertical dimension of the tweezer welder being used. That is, given the size of the tweezer welder, one can determine a minimum aspect ratio needed for the cells of the combustor.

After the welding is completed, the structure can be coated with a suitable combustion catalyst, using known techniques of the prior art. More typically, the structure is coated before assembly, the coating being provided in a desired pattern. For example, there should be no coating in areas where welds are to be made. There also may be other areas without coatings.

The following table shows the various cell densities obtained when the value of H is 0.067, and for various values of L:

| H | H/L | L | CPSI = 2/HL |
|---|---|---|---|
| .067 | 0.3 | .223 | 134 |
| .067 | 0.5 | .134 | 222 |
| .067 | 0.75 | .089 | 334 |
| .067 | 1.0 | .067 | 445 |
| .067 | 1.5 | .045 | 668 |

For H/L in the range of 0.3–0.5, the corrugated foil is relatively easy to make, but for higher values of H/L, the process becomes more difficult. In practice, if H/L is held at or below 0.75, it is possible to weld structures having cell densities up to 334 cpsi. Higher cell densities are obtainable with higher aspect ratios, as noted above.

However, there are practical limitations associated with increasing the aspect ratio. For example, the last entry in the table requires a value of L of 0.045, to yield a cell density of 668 cells per square inch. But such a combustor would be almost impossible to weld with an electrode having a diameter of 0.062 inches, because the electrode would not fit within corrugations having a length that is smaller than the diameter of the electrode.

Although the problem of fitting an electrode between corrugations may be solved by proper choice of other parameters, the use of higher aspect ratios has another inherent disadvantage. The higher the aspect ratio, the poorer the performance of the combustor. Experience has shown that a catalytic combustor in which the aspect ratio is approximately 0.50–0.75 will work best. For this reason, the following embodiments of the present invention provide solutions which do not require increasing the aspect ratio.

FIGS. 3a and 3b illustrate another embodiment of the present invention, which solves the same problem in a different way. FIGS. 3a and 3b comprise schematic diagrams showing the relative positions of flat strips 10 and corrugated strips 12. The corrugated strips are shown, for convenience, as shaded rectangles, to represent the cross-sectional area taken up by the corrugated strips.

In FIG. 3a, each flat strip 10 is welded to a corrugated strip 12, at the positions labeled "x" in the figure. FIG. 3a therefore shows four such pairs of flat and corrugated strips which have been welded together, and which are ready to be assembled into a final product. The welding is performed at the inlet and outlet faces. As shown in FIG. 3a, the flat strips and corrugated strips are offset from each other. In the first and third pairs shown in FIG. 3a, the flat strip extends beyond the left-hand side of the corrugated strip, and the corrugated strip extends beyond the right-hand side of the flat strip. In the second and fourth pairs shown in FIG. 3a, the situation is reversed, with the corrugated strip extending further to the left, and the flat strip extending further to the right. In practice, the amount of offset can be approximately 0.125 inches. The latter figure is intended only as an example, and should not be construed to limit the invention.

The pairs shown in FIG. 3a are then assembled as shown in FIG. 3b, and welded at the positions labeled "x". What is important is that, due to the offset structure described above, the vertical clearance for the tweezer welder, on each side of the weld, is equal to twice the corrugation height H. The latter statement is true as long as the corrugated strips are arranged such that a portion of the corrugated strip touches the flat strip at the point of desired welding. The latter implies that, due to the sawtooth shape of the corrugations, at the desired welding location there will be no portion of the corrugated strip that prevents the tweezer welder from moving through a distance of twice the corrugation height H.

FIG. 4 provides an exploded perspective view of the strips of the embodiment represented in FIGS. 3a and 3b. FIG. 4 shows the flat strips 10 alternating with the corrugated strips 12, and shows the offsets of the strips as described above.

FIG. 5 provides a fragmentary perspective view showing the tweezer welding of a structure made according to the embodiment of FIGS. 3a and 3b. FIG. 5 shows tweezer welder 14 being inserted into the monolith comprising flat strips 10 and corrugated strips 12.

With the process illustrated by FIGS. 3a, 3b, 4, and 5, a structure with corrugation heights of only 0.05 inches can be easily welded, because the effective vertical clearance becomes 0.10 inches on each side of the weld.

As before, the finished structure can then be coated with catalyst by known methods. As described above, this coating can be done before assembly, and using a coating pattern that avoids coating in the areas where welding is to be done, and possibly in other areas as well.

Figures 6A, 6B:
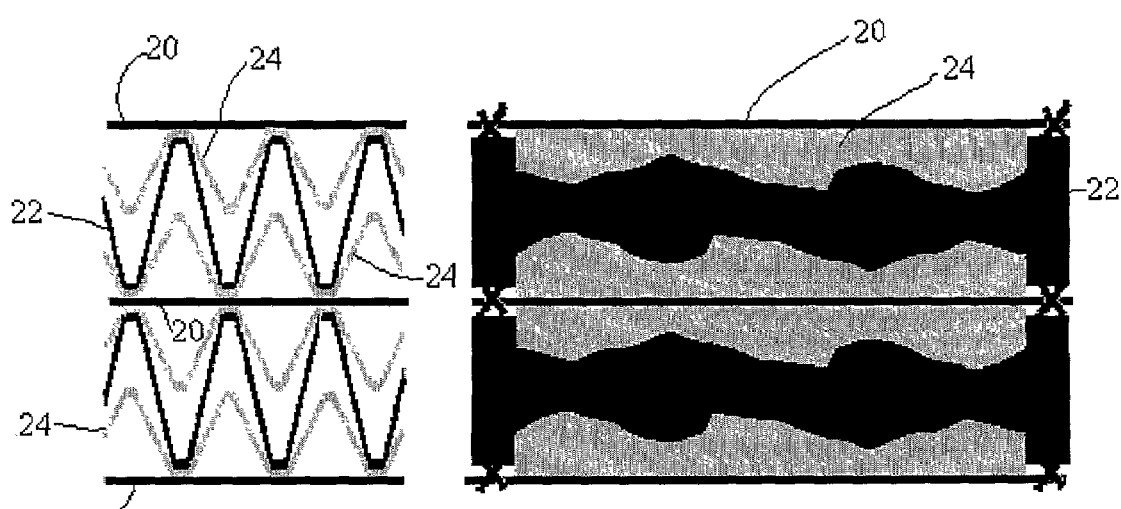

FIGS. 6a and 6b show another embodiment of the present invention. In the combustor shown in FIG. 6a, flat strips 20 surround sets of corrugated strips. Between each pair of flat strips there is a single corrugated strip 22 having high-amplitude corrugations, and a pair of corrugated strips 24 having low-amplitude corrugations. The strips 22 and 24 have the same corrugation pitch L; that is, the period of the corrugations is the same. The height H of the low-amplitude corrugations of strips 24 is approximately half the height of the high-amplitude corrugations of strip 22. Also, the strips 24 are slightly narrower in the flow direction (perpendicular to the paper in FIG. 6a) than the strips 20 and 22. This means that the low-amplitude corrugated strips are recessed relative to both ends of the structure, as shown in the side view of FIG. 6b.

The strips are joined by tweezer welding between the flat strips 20 and the high-amplitude corrugated strips 22, at the locations labeled "x" in FIG. 6b. Because the low-amplitude corrugated strips 24 do not extend to the ends of the combustor, the welding clearance is determined by the high-amplitude corrugated strip 22, and not by the low-amplitude strips 24. But it is the low-amplitude strips which largely determine the effective cell density of the assembled combustor.

Note also that when the high-amplitude corrugated strips 22 are welded to the flat strips 20, the low-amplitude strips 24 are trapped within the combustor and cannot escape, even though they are not welded to anything.

The amount of offset in the embodiment of FIGS. 6a and 6b is typically about 0.125 inches, but this number is only exemplary and should not be deemed to limit the scope of the invention. Other offsets can be used to satisfy particular needs.

Figure 7:
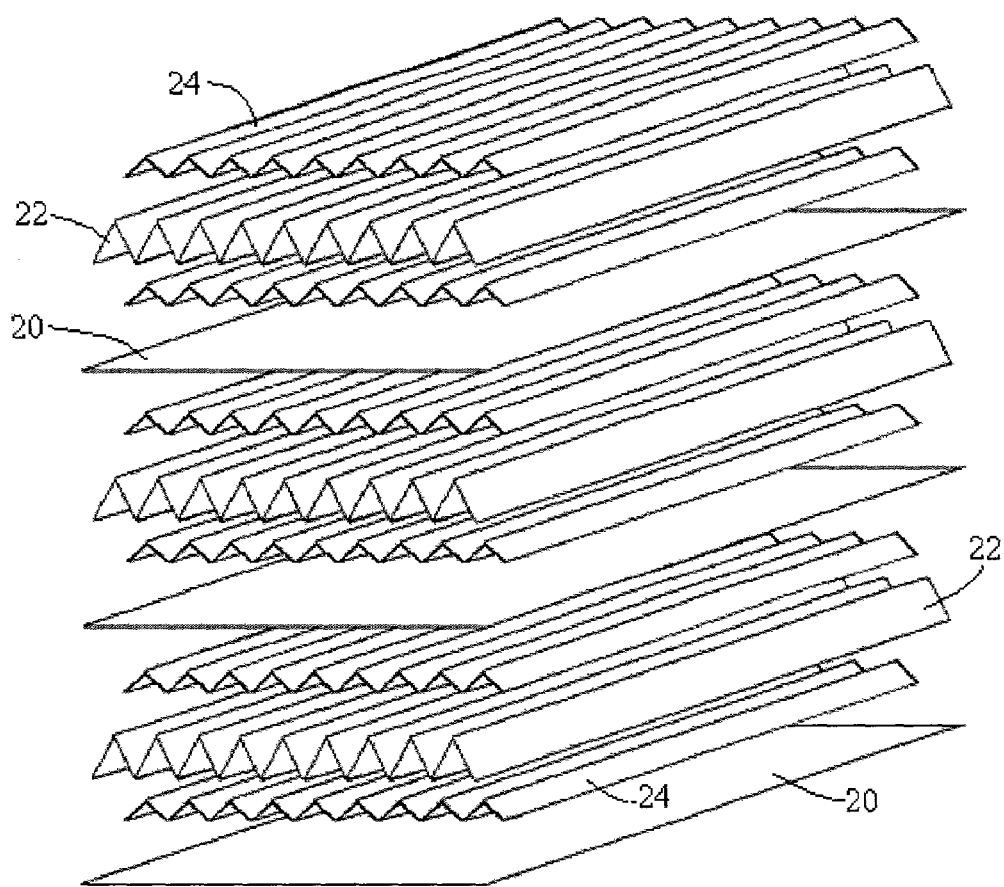
FIG. 7 provides an exploded perspective view showing the various layers of the catalytic combustor symbolized by FIGS. 6a and 6b.

FIG. 7 provides an exploded perspective view which shows the strips of FIG. 6a. FIG. 7 shows all three kinds of strips, namely flat strips 20, high-amplitude corrugated strips 22, and low-amplitude corrugated strips 24.

Figure 8:
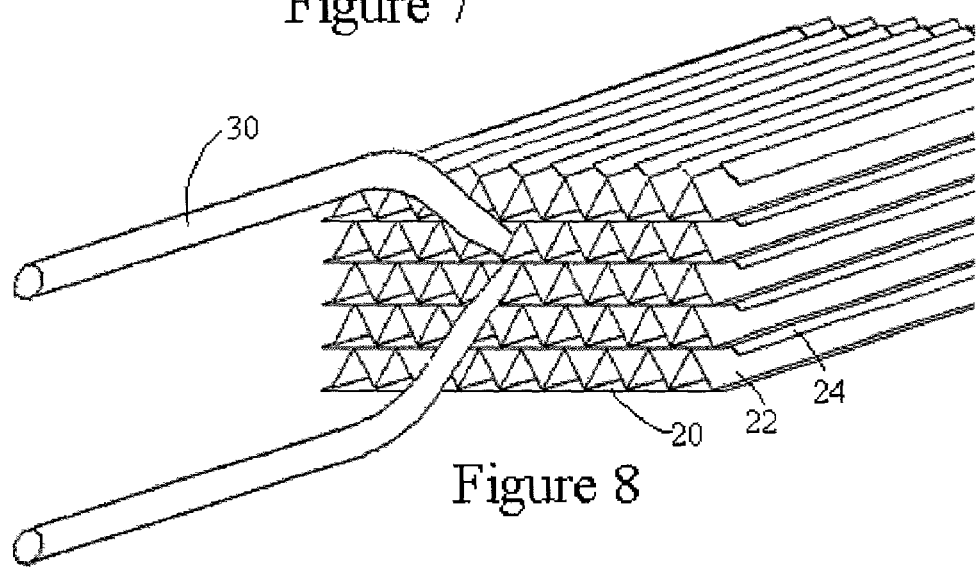
FIG. 8 provides a fragmentary perspective view showing a tweezer welder being used to weld layers of the catalytic combustor symbolized by FIGS. 6a and 6b.

FIG. 8 provides a fragmentary perspective view showing the tweezer welding of a structure made according to the embodiment of FIGS. 6a and 6b. FIG. 8 shows tweezer welder 30 being inserted into the monolith comprising flat strips 20, high-amplitude corrugated strips 22, and low-amplitude corrugated strips 24. Note that the low-amplitude strips are recessed and are not contacted by the tweezer welder.

In both of the embodiments of FIGS. 3–5 and 6–8, some of the strips are displaced relative to other strips, such that not all of the strips terminate at the end faces of the stack. It is this displacement, or offset, that provides the effective increase in corrugation height, and which makes it practical to weld, even when the cell density is high. The use of the inset low-amplitude corrugations, in the embodiments of FIGS. 6–8, substantially increases the effective cell density.

In both of the embodiments of FIGS. 3–5 and 6–8, the effective height of the corrugations, at the end faces of the monolith, is twice what it would be if some of the strips were not recessed. Thus, with the present invention, one can effectively double the cell density of a catalytic combustor. For example, instead of having a combustor with 300 cpsi, one can make a combustor having an effective cell density of 600 cpsi or more, while still using the same tweezer welder used in the prior art.

The invention can be modified in various ways. Different patterns of offset strips can be employed. Additional corrugated layers could be inserted into the stack to form varying configurations of cells. The amount of offset can be changed. And as noted above, the invention applies not only to the case of a generally rectangular stack of flat and corrugated strips, but also applies where the afore-mentioned stack is wound into a spiral, curved into an involute, or formed into some other non-rectangular shape before welding. The same considerations of welding apply to the spiral or other curved structure.

These and other modifications, which will be apparent to those skilled in the art, should be considered within the spirit and scope of the following claims.

What is claimed is:

1. A catalytic combustor formed of a plurality of flat strips and corrugated strips arranged to form a stack, the stack having an end face, the flat and corrugated strips defining a direction of fluid flow along corrugations of said corrugated strips, the combustor comprising a plurality of pairs of flat and corrugated strips, the flat and corrugated strips of each pair being welded together, wherein the flat strip of each pair is offset, in a direction generally parallel to said direction of fluid flow, relative to the corrugated strip of each pair, wherein said pairs are arranged in said stack such that alternate pairs have a flat strip offset towards said end face, and remaining pairs have a corrugated strip offset towards said end face, wherein said pairs are welded together to form a unitary structure.

2. The combustor of claim 1, wherein a flat strip of each pair is welded to a corrugated strip of an adjacent pair.

3. A catalytic combustor comprising a plurality of flat strips, a plurality of high-amplitude corrugated strips, and a plurality of low-amplitude corrugated strips, wherein the flat strips are arranged in a stack such that the flat strips alternate with high-amplitude corrugated strips, the flat and corrugated strips defining a direction of fluid flow along corrugations of said corrugated strips, and wherein a space between the flat strips also contains at least one low-amplitude corrugated strip, wherein the low-amplitude corrugated strip is recessed relative to ends of the flat strips, in a direction generally parallel to said direction of fluid flow, and wherein the flat strips and the high-amplitude corrugated strips are welded together at ends of the flat strips.

4. A catalytic combustor comprising a plurality of metal strips assembled into a stack, wherein some of the strips are flat and some are corrugated, wherein the stack has end faces, the flat and corrugated strips defining a direction of fluid flow along corrugations of said corrugated strips, wherein some of the flat or corrugated strips are displaced relative to others of the flat or corrugated strips, in a direction generally parallel to said direction of fluid flow, such that some of the strips do not terminate at the end faces, wherein the strips are welded together to form a unitary structure.

5. The catalytic combustor of claim 4, wherein the flat strips alternate with the corrugated strips in the stack, and wherein flat strips and corrugated strips are alternately displaced in the stack.

6. The catalytic combustor of claim 4, wherein some of the corrugated strips have low-amplitude corrugations and some of the corrugated strips have high-amplitude corrugations, and wherein the low-amplitude corrugated strips are displaced such that the low-amplitude corrugated strips do not terminate at the end faces.

* * * * *